United States Patent
Xiong et al.

(10) Patent No.: US 11,126,198 B2
(45) Date of Patent: Sep. 21, 2021

(54) ROBOT MOVEMENT CONTROL METHOD, APPARATUS AND ROBOT USING THE SAME

(71) Applicant: UBTECH Robotics Corp, Shenzhen (CN)

(72) Inventors: Youjun Xiong, Shenzhen (CN); Gaobo Huang, Shenzhen (CN); Xiangbin Huang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 325 days.

(21) Appl. No.: 16/236,517

(22) Filed: Dec. 30, 2018

(65) Prior Publication Data
US 2020/0206921 A1 Jul. 2, 2020

(51) Int. Cl.
*G05D 1/02* (2020.01)
*B25J 9/16* (2006.01)

(52) U.S. Cl.
CPC .......... *G05D 1/0272* (2013.01); *B25J 9/1664* (2013.01); *B25J 9/1697* (2013.01); *G05D 1/028* (2013.01)

(58) Field of Classification Search
CPC .......... G05D 1/00; G05D 3/00; G05D 1/0088; G05D 1/0094; G05D 1/021; G05D 3/12; G05D 1/02; G05D 1/0255; G05D 1/0257; G05D 1/0268; G05D 1/028; G05D 1/10
See application file for complete search history.

(56) References Cited

U.S. PATENT DOCUMENTS

| | | | |
|---|---|---|---|
| 9,140,555 B1 * | 9/2015 | Andersson | G01C 21/165 |
| 10,613,527 B2 * | 4/2020 | D'Andrea | G01S 1/00 |

FOREIGN PATENT DOCUMENTS

| | | | | |
|---|---|---|---|---|
| CN | 105657668 A | * | 6/2016 | G01S 5/02 |
| CN | 111381586 A | * | 7/2020 | G05D 1/0276 |
| EP | 3723423 A1 | * | 10/2020 | H04W 4/029 |

OTHER PUBLICATIONS

Micho Radovnikovich, Paul Fleck and Kevin Hallenbeck, Ultra Wide-Band Trajectory Following for an Omnidirectional Factory Automation Vehicle, Apr. 2014, 2014 IEEE International Conference on Technologies for Practical Robot Applications, Woburn, MA (Year: 2014).*

(Continued)

*Primary Examiner* — Jeff A Burke
*Assistant Examiner* — Zachary Joseph Wallace

(57) ABSTRACT

A robot movement control method and apparatus as well as a robot using the same are provided. The method includes: calculating a distance between a robot and a Ultrawide Band (UWB) base station; configuring an internal coordinate system according to a preset position of the UWB base station, and calculating a coordinate of the robot in the internal coordinate system according to a distance between the UWB base station and the robot; combining the coordinate of the robot in the internal coordinate system with localization information of an odometer provided on the robot to obtain a combined robot coordinate; and controlling the robot to move in accordance with a preset target position according to the combined robot coordinate. In such manner, UWB base station localization can be used to control the movement of a robot in a limited scene.

19 Claims, 5 Drawing Sheets

(56) References Cited

OTHER PUBLICATIONS

Youjun Xiong, Gaobo Huang and Xiangbin Huan, English translation of Chinese Patent Robot and Movement Control Method Thereof, CN-111381586-A, Jul. 2020 (Year: 2020).*

Jingjing et al., CN-105657668 EPO Machine Translation (Jan. 8, 2021). (Year: 2021).*

* cited by examiner

ROBOT MOVEMENT CONTROL METHOD, APPARATUS AND ROBOT USING THE SAME

BACKGROUND

1. Technical Field

The present disclosure relates to robot technology, and particularly to a robot movement control method and apparatus as well as a robot using the same.

2. Description of Related Art

The movement control methods of wheeled robots are mainly divided into two categories: navigation and Locomotion autonomous movement. Indoor robot navigation is further divided into three categories: laser radar-based navigation, visual navigation, UWB (ultra-wideband) base station navigation. Among them, laser radar-based navigation is the most mature, but its application scenes are greatly limited by the performance of radar. Some scenes which are large, empty or have more highly reflective materials such as stainless steel are not suitable for lower-cost radar navigation; visual navigation is not yet mature, and is also limited by the conditions of use; UWB base station navigation is more suitable for large and empty scenes, but it requires at least four UWB base stations. For the scenes where four or more base stations can be deployed. UWB navigation can be used. In a scene where four or more UWB base stations are not allowable to be deployed, the requirements of UWB base station navigation cannot be met through the UWB base stations.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the an that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
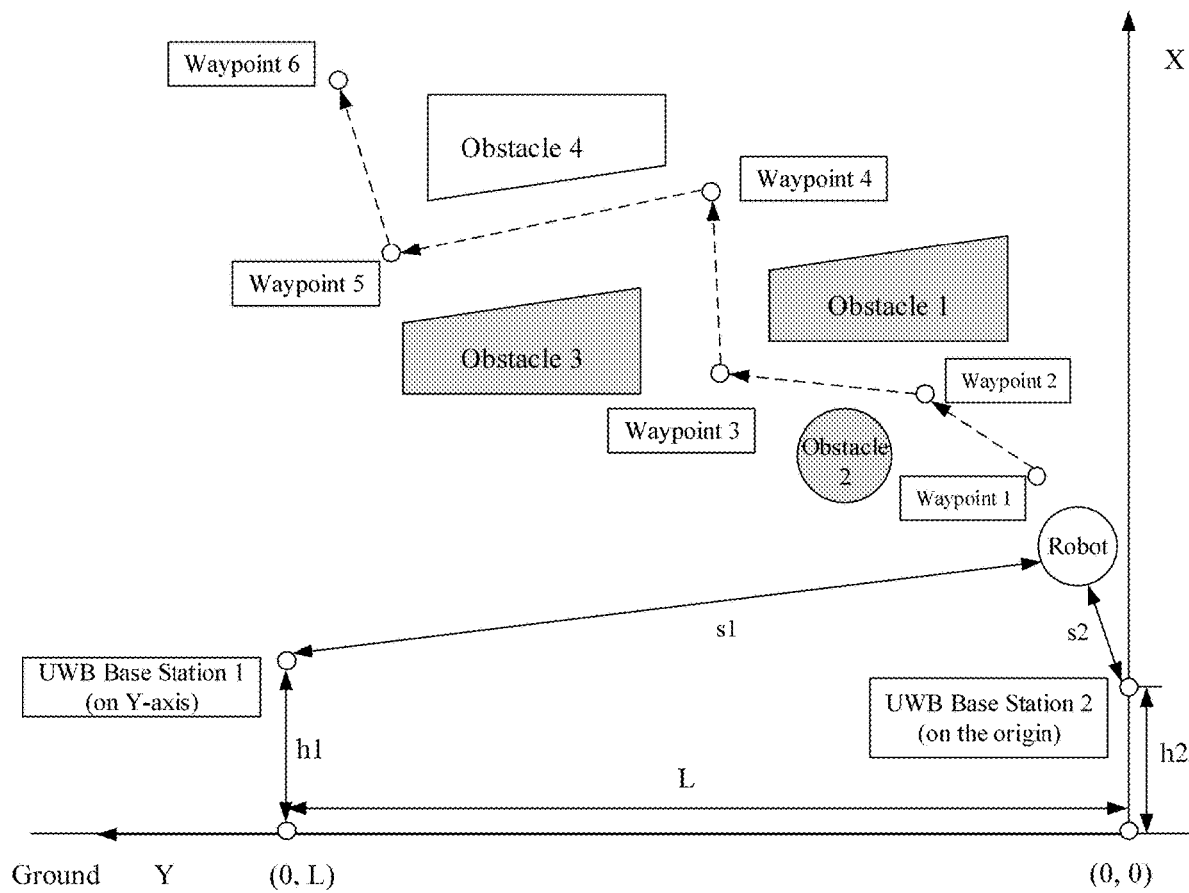
FIG. 1 is a schematic diagram of a scene for robot movement control according to an embodiment of the present disclosure.

FIG. 1 is a schematic diagram of a scene for robot movement control according to an embodiment of the present disclosure. As shown in FIG. 1, in a scene, the starting point of a robot is waypoint 1, the target position of the robot is waypoint 6, and the starting point of the robot may be taken as the off-duty point (e.g., the point for charging) while waypoint 6 may be taken as the on-duty point of the robot. The process of the robot to be moved from waypoint 1 to waypoint 6 is the robot's on-duty process, and the process of the robot to be moved from waypoint 6 to waypoint 1 is the robot's off-duty process. As shown in FIG. 1, between waypoint 1 and waypoint 6, there are sequentially disposed with waypoint 2, waypoint 3, waypoint 4, and waypoint 5. After a coordinate system is generated in the scene, the coordinate of each waypoint can be recorded in advance.

In this embodiment, there includes at least two UWB (ultra-wideband) base stations. As shown in FIG. 1, there are two UWB base stations in the scene. For case of calculation, the origin of the coordinate system is located on UWB base station 2, and UWB base station 1 is located on the Y-axis of the coordinate system. In other embodiments, if there includes three UWB base stations, there may further include UWB base station 3 which is also disposed on the Y-axis. Furthermore, the position of each UWB base station can be obtained. Since the UWB base stations have to transmit wireless signals to the scene, in order to effectively avoid the influence of the obstacles in the scene on the wireless signals, the UWB base station is disposed at the positions of a certain height (the UWB base stations are generally disposed at a height larger than the height of the obstacles such as tables and chairs), the position of the UWB base station includes the horizontal coordinate of the UWB base station and an installation height of the UWB base station (i.e., the height at which the UWB base station is installed). In addition, based on the horizontal coordinate of the UWB base stations, the horizontal distance between the UWB base stations can be calculated. For example, "L" in the figure is the horizontal distance between UWB base station 1 and UWB base station 2.

Figure 2:
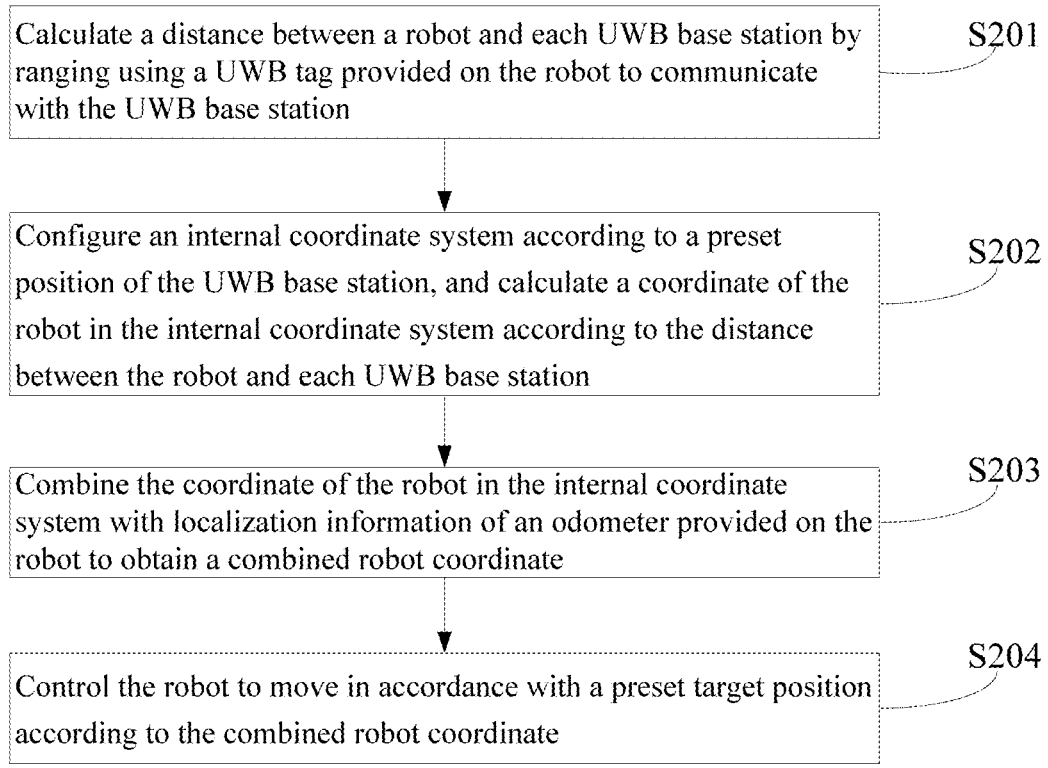
FIG. 2 is a flow chart of a robot movement control method according to the embodiment of FIG. 1.
Figure 4:
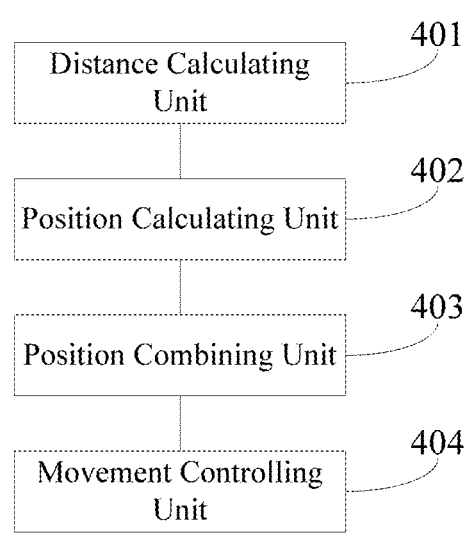
FIG. 4 is a schematic block diagram of a robot movement control apparatus according to an embodiment of the present disclosure.
Figure 5:
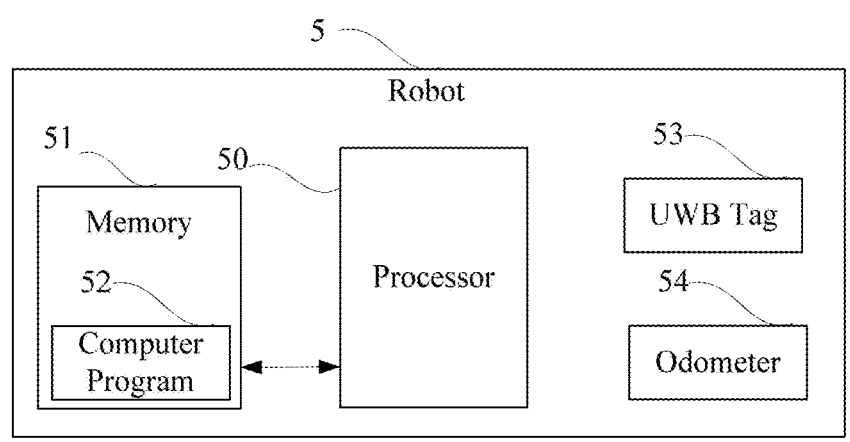
FIG. 5 is a schematic block diagram of a robot according to an embodiment of the present disclosure.

FIG. 2 is a flow chart of a robot movement control method according to the embodiment of FIG. 1. In this embodiment, the method is a computer-implemented method executable for a processor, which may be implemented through a robot movement control apparatus as shown in FIG. 4 or a robot as shown in FIG. 5. The method can be applied to a robot such as a wheeled robot, where the robot is provided with a UWB tag and an odometer. As shown in FIG. 2, the method includes the following steps.

S201: calculating a distance between the robot and each UWB base station by ranging using the UWB tag provided on the robot to communicate with the UWB base station.

Specifically, as shown in FIG. 1, when there are disposed with two UWB base stations in the scene, the UWB tag disposed on the robot can transmit a wireless signal, and the UWB base stations can receive the wireless signal transmitted by the UWR tag and calculate the distance between the robot and each of the UWB base stations based on the wireless signal, and then record the distance as s1 and s2, respectively.

In order to ensure the validity of the calculation, when controlling the robot to move, it may also include a detection for the validity of parameters, where the detection mainly includes whether the distance between the target position and each base station is within a predetermined distance range. For example, the predetermined distance range may be 1-100 meters. In the case that the distance between the UWB base station and the robot is larger than 100 meters or the distance between the UWB base station and the robot is less than 1 meter, the distance parameter is considered to be invalid, and then it needs to adjust the position of the base station or obtain a localization signal of a third UWB base station to calculate the distance between the robot and the third UWB base station.

S202: configuring an internal coordinate system according to a preset position of the UWB base station, and calculating a coordinate of the robot in the internal coordinate system according to the distance between the robot and each UWB base station.

Figure 3:
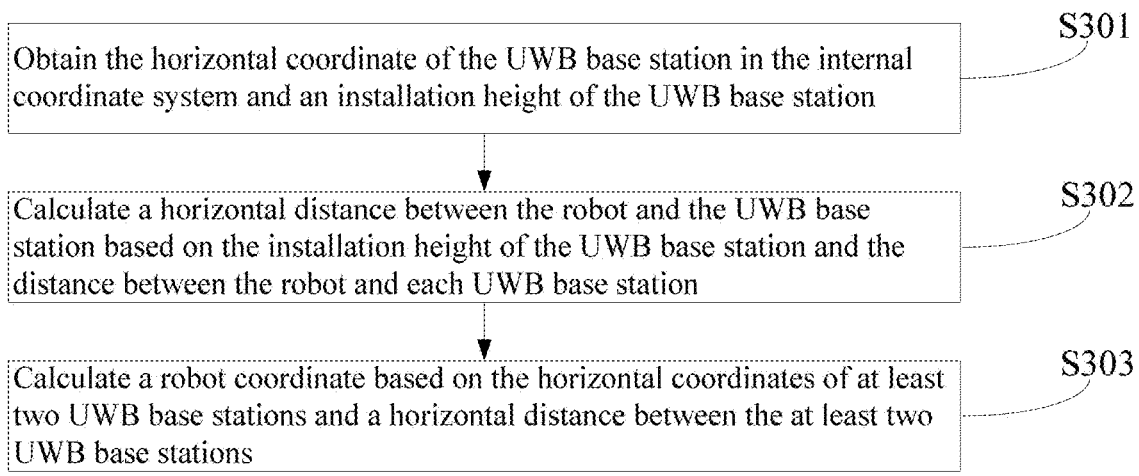
FIG. 3 is a flow chart of an example of calculating the coordinate of the robot which is positioned by the base stations in the method of FIG. 2.

For the effectiveness of signal transmission, the UWB base station is generally disposed at a higher position. Therefore, when calculating the position of the robot which is positioned by the base station, it is necessary to calculate the position which is positioned by the base station by combining height information h of the UWB base station. In this embodiment, the internal coordinate system is the coordinate system generated in the scene of FIG. 1. FIG. 3 is a flow chart of an example of calculating the coordinate of the robot which is positioned by the base stations in the method of FIG. 2. As shown in FIG. 3, the method includes the following steps.

S301: obtaining the horizontal coordinate of the UWB base station in the internal coordinate system and an installation height of the UWB base station.

The horizontal coordinate and installation height of the UWB base station can be measured and/or collected at the time of installation. The installation height of the UWB base station is the vertical height of the UWB base station from the plane at which the robot locates (e.g. the ground). In this embodiment, the plane at which the robot locates is expressed as a horizontal plane. The projection of the position of the UWB base station on the horizontal plane is the horizontal coordinate of the UWB base station.

S302: calculating a horizontal distance between the robot and the UWB base station based on the installation height of the UWB base station and the distance between the robot and each UWB base station.

After calculating the distances between the robot and the UWB base stations through the UWB tag, the horizontal distances between the robot and the UWB base stations can be obtained by using the calculated distance and the height of the UWB base station according to the Pythagorean theorem of right triangle, that is, the distances between the robot and the horizontal coordinates of the UWB base stations.

S303: calculating a robot coordinate based on the horizontal coordinates of at least two UWB base stations and a horizontal distance between the at least two UWB base stations.

The robot coordinate can be calculated based on the distance between the UWB base stations, the installation height of the UWB base stations, and the distances between the UWB base stations and the robot.

For example, as shown in FIG. 1, the coordinate system is generated with the horizontal coordinate of the UWB base stations, where the horizontal coordinate of base station 1 is (0, L), and the horizontal coordinate of base station 2 is (0, 0), the distance between base station 1 and base station 2 is L. It is assumed that the installation height of base station 1 is $h_1$, and the installation height of base station 2 is $h_2$, and the robot measures to obtain that the distance from the robot to base station 1 is $s_1$ and the distance from the robot to base station 2 is $s_2$, then:

the horizontal distance from the robot to base station 1 is $a_1 = \sqrt{h_1^2 + s_1^2}$; and the horizontal distance from the robot to base station 2 is $a_2 = \sqrt{h_2^2 + s_2^2}$;

and then, the current coordinate of the robot is:

$$x = \sqrt{h_2^2 + s_2^2 - \left(\frac{h_2^2 + s_2^2 + L^2 - h_1^2 - s_1^2}{2L}\right)^2};$$

$$y = \frac{h_2^2 + s_2^2 + L^2 - h_1^2 - s_1^2}{2L}.$$

S203: combining the coordinate of the robot in the internal coordinate system with localization information of an odometer provided on the robot to obtain a combined robot coordinate.

Since the data may be drifted when using at least two UWB base stations to perform localization, in order to further improve the accuracy of UWB base station localization, the position obtained by the base station localization is combined with localization information calculated by the odometer. Through the odometer, the displacement of the robot during a short-range movement can be counted accurately, that is, the distance of advancement and the angle of rotation are determined through Locomotion movement, and further determines the robot coordinate through the distance of advancement and the angle of rotation. If the change rate of the difference between the calculated position and the position obtained by the base station localization is larger than a preset value, the robot coordinate is corrected through the position determined by the odometer, thereby obtaining more accurate localization of the robot.

S204: controlling the robot to move in accordance with a preset target position according to the combined robot coordinate.

In the present disclosure, according to the purpose of the movement of the robot, the target position may be set as a robot on-duty point or a robot off-duty point, thereby controlling the robot to be moved to be on-duty and off-duty. After determining the initial position and the target position of the robot, multiple waypoints to be passed through successively can be set by combining the target position with the obstacles in the scene, and the robot is controlled to move according to the current position of the robot and the position of the next waypoint, that is, move according to the order of the waypoints so as to take the next waypoint as the short-term target position of the robot sequentially.

During the movement of the robot, obstacle information of the obstacles in the scene can also be collected in real time through one or more of a depth camera, a radar, and an ultrasonic sensor of the robot, so that the robot can automatically avoid the obstacles according to the collected obstacle information when advancing toward the waypoints, so as to increase the flexibility of the movement of the robot.

The present disclosure is not limited by the regularity and shape of the scene. In which, at least two UWB base stations are disposed, the distances between the robot and the UWB base stations are calculated, and the position of the robot which is obtained by the base station localization is calculated by combining the position of the UWB base stations and the distances of the robot with respect to the UWB base stations, the position obtained by the base station localization is combined with the localization information of the odometer to obtain the combined robot coordinate, and the robot is controlled to move in accordance with the preset target position according to the combined robot coordinate. Consequently, the robot can be controlled to move by using smaller number of UWB base stations, that is, the robot can be controlled to move by combining the localization information of the odometer, which can effectively improve the accuracy of localization and movement.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic block diagram of a robot movement control apparatus according to an embodiment of the present disclosure. A robot movement control apparatus is provided. The apparatus can be applied to a robot such as a wheeled robot, where the robot is provided with a UWB tag and an odometer. As shown in FIG. 4, the robot movement control apparatus includes:

a distance calculating unit 401 configured to calculate a distance between the robot and each UWB base station by ranging using a UWB tag provided on the robot to communicate with the UWB base station;

a position calculating unit 402 configured to configure an internal coordinate system according to a preset position of the UWB base station, and calculate a coordinate of the robot in the internal coordinate system according to a distance between the UWB base station and the robot;

a position combining unit 403 configured to combine the coordinate of the robot in the internal coordinate system with localization information of an odometer provided on the robot to obtain a combined robot coordinate: and a movement controlling unit 404 configured to control the robot to move in accordance with a preset target position according to the combined robot coordinate.

The robot movement control apparatus shown in FIG. 4 corresponds to the robot movement control method shown in FIG. 2. The apparatus may include a processor, a memory, and a computer program stored in the memory and executable on the processor. In which, the computer program includes the above-mentioned modules/units in the apparatus. It should be noted that, each of the above-mentioned modules/units may be implemented in the form of hardware (e.g., a circuit), software (e.g., a program), or a combination thereof (e.g., a circuit with a single chip microcomputer).

FIG. 5 is a schematic block diagram of a robot according to an embodiment of the present disclosure. As shown in FIG. 5, in this embodiment, a robot 5 includes a processor 50, a memory 51, and a computer program 52, a UWB tag 53, and an odometer 54. The computer program 52 is stored in the memory 51 and executable on the processor 50. When executing (instructions in) the computer program 52, the processor 50 implements the steps in the above-mentioned embodiments of the robot movement control method, for example, steps S201-S204 shown in FIG. 2. Alternatively, when the processor 50 executes the (instructions in) computer program 52, the functions of each module/unit in the above-mentioned device embodiments, for example, the functions of the modules 401-404 shown in FIG. 4 are implemented.

Exemplarily, the computer program 52 may be divided into one or more modules / units, and the one or more modules / units are stored in the memory 51 and executed by the processor 50 to realize the present disclosure. The one or more modules / units may be a series of computer program instruction sections capable of performing a specific function, and the instruction sections are for describing the execution process of the computer program 52 in the robot 5. For example, computer program 52 can be divided into:

a distance calculating unit configured to calculate a distance between the robot and each UWB base station by ranging using a UWB tag provided on the robot to communicate with the UWB base station;

a position calculating unit configured to configure an internal coordinate system according to a preset position of the UWB base station, and calculate a coordinate of the robot in the internal coordinate system according to a distance between the UWB base station and the robot;

a position combining unit configured to combine the coordinate of the robot in the internal coordinate system with localization information of an odometer provided on the robot to obtain a combined robot coordinate; and a movement controlling unit configured to control the robot to move in accordance with a preset target position according to the combined robot coordinate.

The robot 5 may include, but is not limited to, a processor 50 and a memory 51. It can be understood by those skilled in the art that FIG. 5 is merely an example of the robot 5 and does not constitute a limitation on the robot 5, and may include more or fewer components than those shown in the figure, or a combination of some components or different components. For example, the robot 5 may further include an input / output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The memory 51 may be an internal storage unit of the robot 5, for example, a hard disk or a memory of the robot 5. The memory 51 may also be an external storage device of the robot 5, for example, a plug-in hard disk, a smart media card (SMC), a secure digital (SD) card, flash card, and the like, which is equipped on the robot 5. Furthermore, the memory 51 may further include both an internal storage unit and an external storage device, of the robot 5. The memory 51 is configured to store the computer program 52 and other programs and data required by the robot 5. The memory 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus 1 robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented movement control method for a robot, comprising executing on a processor the steps of:
    calculating a distance between the robot and a Ultrawide Band (UWB) base station by ranging using a UWB tag provided on the robot to communicate with the UWB base station;
    configuring an internal coordinate system according to a preset position of the UWB base station, and calculating a coordinate of the robot in the internal coordinate system according to the distance between the robot and the UWB base station;
    combining the coordinate of the robot in the internal coordinate system with localization information of an odometer provided on the robot to obtain a combined robot coordinate; and
    controlling the robot to move in accordance with a preset target position according to the combined robot coordinate;
    wherein the coordinate of the robot in the internal coordinate system is calculated by using at least two UWB base stations, and the step of calculating the coordinate of the robot in the internal coordinate system according to the distance between the robot and the UWB base station comprises:
    obtaining a horizontal coordinate of each of the at least two UWB base stations in the internal coordinate system and an installation height of each of the at least two UWB base stations, wherein the installation height of each of the at least two UWB base stations is a vertical height of each of the at least two UWB base stations from a plane at which the robot locates, and the horizontal coordinate of each of the at least two UWB base stations is a projection of position of each of the at least two UWB base stations on the plane at which the robot locates;
    calculating a horizontal distance between the robot and each of the at least two UWB base stations based on the installation height of each of the at least two UWB base stations and the distance between the robot and each of the at least two UWB base stations; and calculating the robot coordinate based on the horizontal coordinate of each of the at least two UWB base stations and a horizontal distance between the at least two UWB base stations.

2. The method of claim 1, wherein the step of calculating the robot coordinate based on the horizontal coordinate of each of the at least two UWB base stations and the horizontal distance between the at least two UWB base stations comprises:
generating a coordinate system based on the horizontal coordinates of the at least two UWB base stations, such that one of the at least two UWB base stations is located at the origin of the coordinate system, and at least one of the other UWB base station is located at a same axis of the coordinate system; and
calculating the robot coordinate based on the distance between the at least two UWB base stations, the installation height of each of the at least two UWB base stations, and the distances between the at least two UWB base stations and the robot.

3. The method of claim 1, wherein the step of controlling the robot to move in accordance with a preset target position according to the combined robot coordinate comprises:
setting positions of waypoints to be passed through successively according to the target position and obstacles in a scene at which the robot locates; and
controlling the robot to move according to the current position of the robot and the position of the next waypoint.

4. The method of claim 1, wherein the step of controlling the robot to move in accordance with a preset target position according to the combined robot coordinate. comprises:
obtaining obstacle information of the obstacles through one or more of a depth camera, a radar, and an ultrasonic sensor; and
avoiding the obstacles automatically during the movement of the robot to the target position based on the combined robot coordinate and the obtained obstacle information.

5. The method of claim 1, wherein the UWB base station is disposed at an edge position in a scene.

6. The method of claim 1, wherein the height of the UWB base station is higher than the height of the obstacles in a scene.

7. A robot, comprising:
a Ultrawide Band (UWB) tag;
an odometer;
a memory;
a processor; and
one or more computer programs stored in the memory and executed by the processor, cause the processor to perform steps of:
calculating a distance between the robot and a UWB base station by ranging using the UWB tag to communicate with the UWB base station;
configuring an internal coordinate system according to a preset position of the UWB base station, and calculating a coordinate of the robot in the internal coordinate system according to the distance between the robot and the UWB base station;
combining the coordinate of the robot in the internal coordinate system with localization information of the odometer to obtain a combined robot coordinate; and
controlling the robot to move in accordance with a preset target position according to the combined robot coordinate;

wherein the coordinate of the robot in the internal coordinate system is calculated by using at least two UWB base stations, and the calculating the coordinate of the robot in the internal coordinate system according to the distance between the robot and the UWB base station comprises:
obtaining a horizontal coordinate of each of the at least two UWB base stations in the internal coordinate system and an installation height of each of the at least two UWB base stations, wherein the installation height of each of the at least two UWB base stations is a vertical height of each of the at least two UWB base stations from a plane at which the robot locates, and the horizontal coordinate of each of the at least two UWB base stations is a projection of position of each of the at least two UWB base stations on the plane at which the robot locates;
calculating a horizontal distance between the robot and each of the at least two UWB base stations based on the installation height of each of the at least two UWB base stations and the distance between the robot and each of the at least two UWB base stations; and
calculating the robot coordinate based on the horizontal coordinate of each of the at least two UWB base stations and a horizontal distance between the at least two UWB base stations.

8. The robot of claim 7, wherein the calculating the robot coordinate based on the horizontal coordinate of each of the at least two UWB base stations and the horizontal distance between the at least two UWB base stations comprises:
generating a coordinate system based on the horizontal coordinates of the at least two UWB base stations, such that one of the at least two UWB base stations is located at the origin of the coordinate system, and at least one of the other UWB base station is located at a same axis of the coordinate system; and
calculating the robot coordinate based on the distance between the at least two UWB base stations, the installation height of each of the at least two UWB base stations, and the distances between the at least two UWB base stations and the robot.

9. The robot of claim 7, wherein the controlling the robot to move in accordance with a preset target position according to the combined robot coordinate comprises:
setting positions of waypoints to be passed through successively according to the target position and obstacles in a scene at which the robot locates; and
controlling the robot to move according to the current position of the robot and the position of the next waypoint.

10. The robot of claim 7, wherein the controlling the robot to move in accordance with a preset target position according to the combined robot coordinate comprises:
obtaining obstacle information of the obstacles through one or more of a depth camera, a radar, and an ultrasonic sensor; and
avoiding the obstacles automatically during the movement of the robot to the target position based on the combined robot coordinate and the obtained obstacle information.

11. The robot of claim 7, wherein the UWB base station is disposed at an edge position in a scene.

12. The robot of claim 7, wherein the height of the UWB base station is higher than the height of the obstacles in a scene.

13. The method of claim 1, wherein the plane at which the robot locates is a horizontal plane.

14. The method of claim 1, wherein before the step of controlling the robot to move in accordance with the preset target position according to the combined robot coordinate, the method further comprises:
   determining whether the distance between the robot and the UWB base station is within a preset distance range; and
   adjusting a position of the UWB base station or obtaining a localization signal of another UWB base station to calculate a distance between the robot and the another UWB base station, when the distance between the robot and the UWB base station is not within the preset distance range.

15. The method of claim 1, wherein the combined robot coordinate is obtained by:
   determining whether a change rate of difference between a position of the robot determined by the odometer and the coordinate of the robot in the internal coordinate system is larger than a preset value, and
   correcting the coordinate of the robot in the internal coordinate system through the position determined by the odometer, when the change rate is larger than the preset value.

16. The method of claim 1, wherein the step of calculating the distance between the robot and the UWB base station comprises:
   transmitting a wireless signal through the UWB tag; and
   calculating, by the UWB base station, the distance between the robot and the UWB base station based on a wireless signal received by the UWB base station and transmitted from the UWB tag.

17. The method of claim 2, wherein the coordinate of the robot in the internal coordinate system is calculated by using a first UWB base station and a second UWB base station;
   a horizontal distance from the robot to the first UWB base station is calculated by:
   $a_1 = \sqrt{h_1^2 + s_1^2}$;
   a horizontal distance from the robot to the second UWB base station is calculated by:
   $a_2 = \sqrt{h_2^2 + s_2^2}$; and
   the coordinate of the robot is calculated by:

$$x = \sqrt{h_2^2 + s_2^2 - \left(\frac{h_2^2 + s_2^2 + L^2 - h_1^2 - s_1^2}{2L}\right)^2}, \text{ and}$$

$$y = \frac{h_2^2 + s_2^2 + L^2 - h_1^2 - s_1^2}{2L};$$

wherein L is a distance between the first UWB base station and the second UWB base station, $h_1$ is an installation height of the first UWB base station, $h_2$ is an installation height of the second UWB base station, $s_1$ is a distance from the robot to the first UWB base station, and $s_2$ is a distance from the robot to the second UWB base station.

18. The robot of claim 7, wherein the plane at which the robot locates is a horizontal plane.

19. The robot of claim 7, wherein before controlling the robot to move in accordance with the preset target position according to the combined robot coordinate, further cause the processor to:
   determine whether the distance between the robot and the UWB base station is within a preset distance range; and
   adjust a position of the UWB base station or obtain a localization signal of another UWB base station to calculate a distance between the robot and the another UWB base station, when the distance between the robot and the UWB base station is not within the preset distance range.

* * * * *